June 10, 1952  I. KNUTZEN  2,599,843
ROTARY PLANT CHOPPING ELEMENT
Filed Dec. 17, 1946
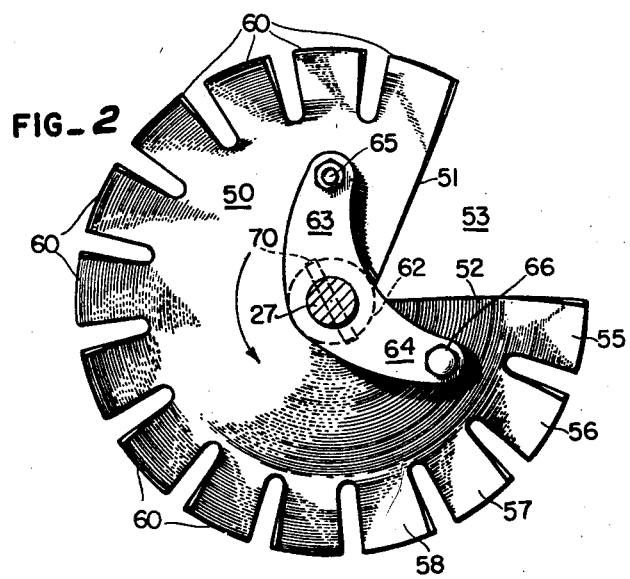
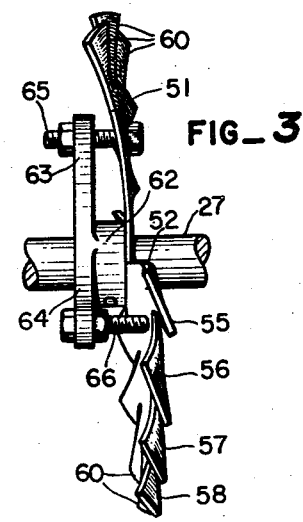
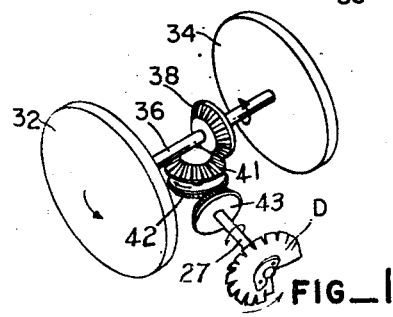
IVER KNUTZEN
*INVENTOR.*
BY *Swift & Tuck*
ATTORNEYS Patented June 10, 1952

2,599,843

UNITED STATES PATENT OFFICE 2,599,843

ROTARY PLANT CHOPPING ELEMENT

Iver Knutzen, Christiansfeld, Denmark

Application December 17, 1946, Serial No. 716,795
In Denmark January 26, 1939

1 Claim. (Cl. 97—213)

This invention relates to a cultivator for row crops such as beets, carrots, and the like and is, more particularly, a rotary mechanism useful for thinning seedlings in a row by removing or unearthing portions and cultivating the row while leaving others untouched for growth where germinated or planted.

Mechanisms for thinning row crops have been used, but it is common knowledge that they injure the plants that are to be left, that they tend to cover with dirt the plants being left, to the end that growth is retarded, if not precluded, that they do not cleanly remove that portion of a row of seedlings which it is desired to unearth, and that they are not critical enough in handling that portion of the row that is left, to preclude hand thinning of cultivating, because the untouched blocks of the row, not unearthed, often comprise several plants, which must be reduced in number, usually by hand.

It is, therefore, an important object of this invention to solve the problems mentioned above by providing a mechanism which is simple to construct and operate, and which will accurately and with a high degree of precision unearth and leave untouched portions of a row crop of seedlings, and also will weed the row between the untouched row portions.

Further objects of this invention include the provision of a cultivator which may be adjusted to vary the spacing of the unearthed portions in a thinning operation on a row crop, which is not deleteriously affected by long and hard usage under many conditions of soil and crops that might be encountered, and which will operate synchronously with a direction of movement that may be established to produce, without regard to the speed of such movement, uniform thinning of a crop row.

The foregoing objects and others ancillary thereto, I prefer to accomplish as follows:

According to the preferred embodiment of my invention, I employ a vehicle which is movable along a crop row and which includes an element that rotates in proportion to the forward movement of such vehicle. A disc is rotatably supported from said vehicle with its axis of rotation in the direction of travel and this disc is synchronously coupled to the rotatable element to receive power therefrom. Thus it will be seen that the disc has both forward movement and rotary motion in that movement. The disc has a peripheral gap which permits skipping some of the vegetation when the disc moves in the row with its edge slightly penetrating the earth. Adjacent the gap in the disc is provided blade means which is disposed in a plane that intersects the general plane of the disc, and which blade means serves to propel from the row intermittent portions thereof. The disc may take several forms, of which I herein disclose at least two having different arrangements of the blade means. I also provide means whereby the blade may be warped to produce adjustment of the gap and to vary the amount of skipping to be had in the row.

The novel features that I consider characteristic of my invention are set forth with particularity in the appended claim. The invention itself, however, both as to its organization and its method of operation, together with additional objects and advantages thereof, will best be understood from the following description of a specific embodiment when read in connection with the accompanying drawings, in which:

Fig. 1 is a diagrammatic view showing my cultivating vehicle mechanism;

Fig. 2 is a rear elevational view of the disc used in my cultivator; and

Fig. 3 is an edge view of the disc of Fig. 2.

A cultivator for row crops, to overcome the defects above enumerated, must have at least two totally distinct characteristics; it must be capable of simple production and operation; and it must provide a mechanism which is accurate in use to thin and weed rows of seedlings, and the like, without taking out or leaving too many, and without covering or otherwise injuring that portion of the row that remains. Accordingly, a preferred embodiment of my invention, referring to Fig. 1 of the drawing, is constituted by a vehicle which carries the cultivator element and includes means for translating forward motion into a rotary motion about an axis lying in the direction of travel of the vehicle and is synchronized to the speed of forward movement.

The disc shown in Figures 2 and 3 is the element which, in a cultivating operation, performs the actual manipulation of the earth and vegetation. It is to be understood that such discs are preferably formed of sheet metal, such as steel, and that they are hardened for long life.

Disc D on shaft 27 is mounted on and carried by a vehicle in a position so that the axis of rotation is in the direction of travel of the vehicle down the crop row, and thus it will be seen that there is a combination of rotary and forward movement during cultivation. Such a vehicle is suggested in Fig. 1 as comprising a pair of wheels 32 and 34 on axle 36, to which is keyed gear 38 for rotation simultaneously with forward movement of the wheels 32, 34. A pillar shaft 40, suitably journalled at right angles to axle 36, has pinion 41 in mesh with bevel gear 38. Gear 42 meshes with pinion 43 on shaft 27, to the rear of which is secured a cultivator disc D.

The cultivator disc shown in Figs. 2 and 3, includes a disc body 50 cut away between edges 51 and 52 to form gap 53. The disc periphery is slit or slotted to form a plurality of teeth as shown. Teeth 55, 56, 57, and 58, adjacent the edge 52 of gap 53 are twisted in a common manner, counterclockwise as viewed from the outer tooth end. The remainder of the teeth 60 are likewise twisted but opposite to teeth 55, 56, 57 and 58, in other words, teeth 60 have had a clockwise twist applied. Thus it will be seen that, considering gap edge 52 as a re-entrant edge, teeth 55 through 58 will bite into the earth and vegetation and tend to force the same forward until the disc has rotated enough to bring teeth 60 into penetrating position, whereupon earth is moved rearward until gap edge 51 withdraws from the soil.

To permit skipping in a thinning operation, the edges of gap 53 are racked or canted out of the general plane of disc 50. This action is obtained by providing on hub 62, secured by key 70, to shaft 27, the arms 63 and 64 which receive bolts 65 and 66, respectively. Bolt 65 passes through disc 50 and is secured to arm 63 to draw the gap edge of the disc toward that arm. Bolt 66 operates to force the disc and its gap edge away from arm 64. In this way, a staggered arrangement is obtained between the positioning of edges 51 and 52, and it will be seen that a skip in the cultivating operation is likewise had.

While I have shown and described particular embodiments of my invention, it will occur to those skilled in the art that various changes and modifications may be made without departing from the invention, and I therefore aim in the appended claim to cover all such changes and modifications as fall within the true spirit and scope of my invention.

Having thus described my invention, I claim:

For use in thinning row crop seedlings and the like, a rotary element of the type to be rotated with edge penetration in a crop row about an axis overlying the row and aligned therewith, comprising: a discoidal body having a gap in its edge; a minor portion of said body at an end of said gap having an entering edge to slice into the earth and said row and sever the same from a portion of the row being left intact; said minor portion of said body adjacent the entering edge being forwardly canted and non-perpendicular to the axis of rotation and having at its edge a first series of vanes twisted to displace obliquely forward earth material from said row contiguous with and in advance of that being left intact as said body rotates and advances; a major portion of said body being substantially perpendicular to said axis of rotation from adjacent the following edge of said gap and having a second series of vanes on its periphery twisted to displace laterally from said row earth material as the body is simultaneously rotated and advanced; said second series of vanes being oppositely twisted relative said first series of vanes; whereby upon rotary and advancing movement of said body certain portions of a row of seedlings is cleanly separated and laterally displaced from certain intermediate portions which are left intact, said disc having a rigid hub thereon and said hub having an arm outstanding therefrom and carrying a screw to engage said non-perpendicular portion of the disc and support the same.

IVER KNUTZEN.

REFERENCES CITED

The following references are of record in the file of this patent:

UNITED STATES PATENTS

| Number | Name | Date |
|---|---|---|
| 716,696 | Foster | Dec. 23, 1902 |
| 885,654 | Smith | Apr. 21, 1908 |
| 1,145,964 | Barr | July 13, 1915 |
| 1,343,777 | Hart et al. | June 15, 1920 |
| 1,779,834 | Uddenborg | Oct. 28, 1930 |